US005753317A

United States Patent [19]
Law et al.

[11] Patent Number: 5,753,317
[45] Date of Patent: May 19, 1998

[54] ELECTRICALLY CONDUCTIVE PROCESSES

[75] Inventors: Kock-Yee Law, Penfield; Ihor W. Tarnawskyj; Martin A. Abkowitz, both of Webster; Frederick E. Knier, Jr., Wolcott; Joseph Mammino, Penfield, all of N.Y.

[73] Assignee: Xerox Corporation, Stamford, Conn.

[21] Appl. No.: 808,765

[22] Filed: Mar. 3, 1997

[51] Int. Cl.⁶ .................. B05D 3/02; B05D 3/14
[52] U.S. Cl. .......... 427/487; 427/522; 427/388.4; 427/393.5
[58] Field of Search .............. 427/388.1, 388.4, 427/393.5, 487, 522

[56] References Cited

U.S. PATENT DOCUMENTS

| | | | |
|---|---|---|---|
| 4,118,235 | 10/1978 | Horiuchi et al. | 106/38.22 |
| 4,308,063 | 12/1981 | Horiuchi et al. | 106/38.22 |
| 4,427,803 | 1/1984 | Fukui et al. | 523/402 |
| 4,524,119 | 6/1985 | Luly et al. | 430/108 |
| 4,840,675 | 6/1989 | Fukui et al. | 106/38.22 |
| 5,166,031 | 11/1992 | Badesha et al. | 430/124 |
| 5,177,538 | 1/1993 | Mammino et al. | 355/259 |
| 5,208,638 | 5/1993 | Bujese et al. | 355/274 |
| 5,266,431 | 11/1993 | Mammino et al. | 430/96 |
| 5,303,014 | 4/1994 | Webster et al. | 355/273 |
| 5,397,863 | 3/1995 | Afzali-Ardakani et al. | 174/258 |
| 5,585,903 | 12/1996 | Mammino et al. | 355/271 |
| 5,587,110 | 12/1996 | Yamana et al. | 252/511 |

FOREIGN PATENT DOCUMENTS

| | | |
|---|---|---|
| 53-147542 | 12/1978 | Japan. |
| 57-048782B | 10/1982 | Japan. |
| 7160138-A | 6/1995 | Japan. |
| 8-015960 | 1/1996 | Japan. |
| 8160759-A | 6/1996 | Japan. |

*Primary Examiner*—Erma Cameron
*Attorney, Agent, or Firm*—Annette L. Bade

[57] ABSTRACT

A process for preparing coatings or layers containing a fluorinated carbon filled fluoroelastomer wherein the resistivity of the fluorinated carbon filled fluoroelastomer is controlled.

32 Claims, No Drawings

ELECTRICALLY CONDUCTIVE PROCESSES

CROSS REFERENCE TO RELATED APPLICATIONS

Attention is directed to the following copending applications assigned to the assignee of the present application: U.S. application Ser. No. 08/672,803 filed Jun. 24, 1996, entitled, "Biasable Charging Members;" U.S. application Ser. No. 08/635,356 filed Apr. 16, 1996, entitled, "Biasable Transfer Members;" Attorney Docket No. D/95610, U.S. application Ser. No. 08/786,614 filed Jan. 21, 1997, entitled, "Ohmic Contact-Providing Compositions;" U.S. application Ser. No. 08/706,057 filed Aug. 28, 1996, entitled, "Fixing Apparatus and Film;" U.S. application Ser. No. 08/706,387 filed Aug. 28, 1996, entitled, "Instant On Fuser System Members;" Attorney Docket No. D/95632, U.S. application Ser. No. 08/779,287 filed Jan. 21, 1997, entitled, "Intermediate Transfer Members;" and Attorney Docket No. D/96605, U.S. application Ser. No. 08,808,775 filed Mar. 03, 1997, entitled, "Electrically Conductive Coatings." The disclosures of each of these applications are hereby incorporated by reference in their entirety.

BACKGROUND OF THE INVENTION

The present invention relates to electrically conductive coatings and processes for the preparation thereof, and more specifically, to processes for producing electrically conductive coatings useful as coatings or layers for components for electrical applications, especially electrostatographic applications such as xerographic applications. In embodiments of the present invention, there are selected electrically conductive coatings or layers comprising a polymer filled with an electrically conductive material. In a preferred embodiment, the polymer is a fluoropolymer, and particularly preferred a fluoroelastomer, and the preferred filler is a fluorinated carbon. In embodiments, the present invention allows for the preparation and manufacture of coatings or layers for xerographic components, the coatings and layers having excellent electrical, chemical and mechanical properties, including controlled resistivity in a desired resistivity range. Further, in embodiments, the coatings and layers exhibit excellent chemical and electrical properties such as statistical insensitivity of resistivity to increases in temperature and to environmental changes.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Generally, the electrostatic latent image is developed by bringing a developer mixture into contact therewith. A dry developer mixture usually comprises carrier granules having toner particles adhering triboelectrically thereto. Toner particles are attracted from the carrier granules to the latent image forming a toner powder image thereon. Alternatively, a liquid developer material may be employed. The liquid developer material includes a liquid carrier having toner particles dispersed therein. The liquid developer material is advanced into contact with the electrostatic latent image and the toner particles are deposited thereon in image configuration. After the toner particles have been deposited on the photoconductive surface, in image configuration, it is transferred to a substrate such as a copy sheet. The toner image is usually fixed or fused upon a support which may be the photosensitive member itself or other support sheet such as plain paper.

Because there is required numerous transfers and fixation of charged toner particles by various components in the xerographic process, it is desired to provide components with layers that allow for the charged particles to be exchanged from component to component or from component to substrate (in the case of fusing toner to a substrate such as paper) with near 100% transfer efficiency. In order to help decrease charge exchange and increase toner transfer efficiency, the resistivity of the components must be within a desired range, and preferably, the resistivity should be virtually unaffected to changes in humidity, temperature and operating time. Attempts at controlling the resistivity of various components have been accomplished by, for example, adding conductive fillers such as ionic additives and/or carbon black to the component layers.

U.S. Pat. No. 5,537,195 discloses an intermediate transfer member for use with liquid developers, wherein the intermediate transfer member comprises a fluorocarbon elastomer with metal oxide fillers therein.

U.S. Pat. No. 5,525,446 discloses an intermediate transfer member for use with color systems which includes a base layer and a top polycarbonate layer, wherein the top layer can include electrical property regulating materials such as metal oxides or carbon black.

U.S. Pat. No. 5,456,987 discloses an intermediate transfer component for both dry and liquid toner, comprising a substrate and a coating comprised of integral, interpenetrating networks of haloelastomer, titanium oxide and optionally polyorganosiloxane, wherein the substrate may include dielectric or conductive fillers such as carbon or metal oxide particles.

U.S. Pat. No. 5,084,738 discloses use of a resistive heating layer with resistivity ranging from 20 to 2000 ohm-cm in a fusing apparatus. The resistivity of the layer is achieved by adding conductive carbon fillers into a polymer layer.

U.S. Pat. No. 5,112,708 to Okunuki et al. discloses a charging member comprising a surface layer formed of N-alkoxymethylated nylon which may be filled with fluorinated carbon.

While addition of electrically conductive additives to polymers may partially control the resistivity of polymer coatings or layers to some extent, there are problems associated with the use of these additives, such as problems with non-uniform dispersity. In particular, undissolved particles frequently bloom or migrate to the surface of the polymer and cause an imperfection in the polymer. This leads to a nonuniform resistivity, which in turn, leads to poor antistatic properties and poor mechanical strength. The ionic additives on the surface may interfere with toner release and affect toner offset. Furthermore, bubbles appear in the conductive polymer, some of which can only be seen with the aid of a microscope, others of which are large enough to be observed with the naked eye. These bubbles provide the same kind of difficulty as the undissolved particles in the polymer namely, poor or nonuniform electrical properties and poor mechanical properties.

In addition, the ionic additives themselves are sensitive to changes in temperature, humidity, and operating time. For the vast majority of conductive particle filled systems, there is observed a percolation threshold or concentration range in which the resistivity of the filled polymer will change by many orders of magnitude over a small concentration. These sensitivities often limit the resistivity range. For example, the resistivity usually decreases by up to two orders of magnitude or more as the humidity increases from 20% to 80% relative humidity. This effect limits the operational or process latitude.

Moreover, ion transfer can also occur in these systems. The transfer of ions will lead to charge exchanges and insufficient transfers, which in turn, will cause low image resolution and image deterioration, thereby adversely affecting the copy quality. In color systems, additional adverse results are color shifting and color deterioration. Ion transfer also increases the resistivity of the polymer coating or layer after repetitive use. This can limit the process and operational latitude and eventually the ion-filled polymer component will be unusable.

Carbon black particles can impart other specific adverse effects. Such carbon dispersions are difficult to prepare due to carbon gelling, and the resulting layers may deform due to gelatin formation. This can lead to an adverse change in the conformability of the layer, which in turn, can lead to insufficient transfer and poor copy quality, and possible contamination of other machine parts and later copies.

Generally, carbon additives tend to control the resistivities and provide somewhat stable resistivities upon changes in temperature, relative humidity, running time, and leaching out of contamination to photoconductors. However, the required tolerance in the filler loading to achieve the required range of resistivity has been extremely narrow. This, along with the large "batch to batch" variation, leads to the need for extremely tight resistivity control. In addition, carbon filled polymer surfaces have typically had very poor dielectric strength and sometimes significant resistivity dependence on applied fields. This leads to a compromise in the choice of centerline resistivity due to the variability in the electrical properties, which in turn, ultimately leads to a compromise in performance.

Therefore, there exists an overall need for compositions useful as coatings or layers for xerographic components and processes for producing such coatings or layer, which provide for increased toner transfer efficiency and a decrease in the occurrence of charge exchange or toner offset. More specifically, there exists a specific need for a composition useful as coatings or layers for xerographic components, wherein the layers having controlled resistivity in a desired range so as to neutralize toner charges, thereby decreasing the occurrence of charge exchange or toner offset, increasing image quality and preventing contamination of other xerographic members.

SUMMARY OF THE INVENTION

Examples of objects of the present invention include:

It is an object of the present invention to provide processes for producing compositions useful as coatings and layers, and methods thereof with many of the advantages indicated herein.

Further, it is an object of the present invention to provide a process for producing a coating which has superior electrical properties including a stable resistivity in the desired resistivity range.

It is another object of the present invention to provide a process for producing a coating with a controlled resistivity which is virtually unaffected by changes in humidity.

Yet another object of the present invention to provide a process for producing a coating with a controlled resistivity which is virtually unaffected by changes in temperature.

Another object of the present invention is to provide a process for producing a coating with a controlled resistivity which is virtually unaffected by changes in applied electric field.

A further object of the present invention is to provide a process for producing a coating which possesses a decreased hysteresis effect. A still further object of the present invention is to provide a process for producing a coating which provides more uniform dispersity of conductive filler within the coating.

The present invention includes, in embodiments: a process for producing a fluorinated carbon filled fluoroelastomer coating comprising: a) mixing a fluorinated carbon with a fluoroelastomer; b) mixing a curative therewith to form a dispersion; c) depositing the dispersion onto a substrate to form a layer; and d) curing the deposited layer to form a fluorinated carbon filled fluoroelastomer coating.

Embodiments further include: a process for controlling the resistivity of a coating comprising: a) mixing a fluorinated carbon with a fluoroelastomer; b) mixing a curative therewith to form a dispersion; c) depositing the dispersion onto a substrate to form a layer; and d) curing the deposited layer to form a fluorinated carbon filled fluoroelastomer coating, wherein the fluorinated carbon filled fluoroelastomer coating has a controlled resistivity of from about $10^2$ to about $10^{14}$ ohm-cm.

In addition, embodiments include: a process for the preparation of a component comprised of a substrate and a fluorinated carbon filled fluoroelastomer coating, wherein the process comprises: a) mixing a fluorinated carbon with a fluoroelastomer; b) mixing a curative therewith to form a dispersion; c) depositing the dispersion onto a substrate to form a layer; and d) curing the deposited layer to form a fluorinated carbon filled fluoroelastomer coating, wherein the fluorinated carbon filled fluoroelastomer coating has a controlled resistivity of from about $10^2$ to about $10^{14}$ ohm-cm.

The processes for producing the coatings and layers herein, in embodiments, enable control of desired resistivities, allow for uniform electrical properties including resistivity, and neutralize toner charges, all of which contribute to good release properties, a decrease in the occurrence of charge exchange, a decrease in the occurrence of toner offset, an increase in image quality, and a decrease in contamination of other xerographic components such as photoconductors. The coatings and layers provided herein, in embodiments, also have improved insensitivities to environmental and mechanical changes.

DETAILED DESCRIPTION OF THE PRESENT INVENTION

The present invention relates to processes for producing coatings and layers comprising a fluorinated carbon filled fluoroelastomer. These coatings and layers are useful as layers for components useful in electrical applications, such as xerographic applications. The resistivity of the layers or coatings is essential for proper and efficient performance of the components. Depending on the function of the component and process speed of the apparatus, the electrical requirements for the coatings are different. Generally, the desired volume resistivity of the coatings is from about $10^2$ to about $10^{14}$ ohm-cm, and the desired surface resistivity is from about $10^2$ to about $10^{14}$ ohm/sq, for many xerographic components. The preferred volume resistivity for most xerographic systems is from about $10^3$ to about $10^{12}$ ohm-cm and the preferred surface resistivity is from about $10^3$ to about $10^{12}$ ohm/sq. Examples of preferred resistivity ranges for various components are as follows. For example, the preferred resistivity range for an intermediate transfer belt surface is from about $10^4$ to about $10^{12}$ ohm-cm; the desired volume resistivity for a scavengeless development electrode donor member overcoat is about $10^9$ ohm-cm; the conductive core for a bias charging roll has a desired volume resistivity of from about $10^5$ to about $10^{12}$ ohm-cm; the preferred resistivity of a donor roll coating is from about $10^6$ to about $10^{12}$; while the preferred resistivity of an overcoat for a bias charging member is from about $10^3$ to about $10^{10}$ ohm-cm.

A fluoroelastomer in combination with a fluorinated carbon filler dispersed therein, provides superior results by, for example, allowing a resistivity within a specific range desired for a specific application, wherein the resistivity is virtually unaffected by environmental changes such as changes in humidity and temperature, or mechanical changes such as changes in the electrical charge or field associated with the component. This controlled resistivity is an important and superior feature of the present invention.

More specifically, although with known coatings, a change in temperature or a change in humidity can cause a severe change in the resistivity of the coating, the coatings of the present invention are much less reactive to environmental changes. The coatings comprising fluorinated carbon filled fluoroelastomers have controlled resistivity. For example, the resistivity usually decreases by up to two orders of magnitude or more as the humidity increases from 20% to 80% relative humidity. This effect limits the operational or process latitude. However, with fluorinated carbon filled fluoroelastomers, the resistivity of the coating is controlled and will remain within the desired range of $10^2$ to about $10^{14}$ ohms-cm, or the preferred range of from about $10^3$ to about $10^{14}$ ohms-cm, at broad temperatures ranging from about 0° C. to about 200° C., and/or at broad humidity ranges of 0 to about 80% relative humidity. In preferred embodiments, the desired resistivity will remain within from about 50 to about 100% of the original desired resistivity range upon a temperature range of from about 0° C. to about 200° C., and/or will remain within from about 50 to about 100% of the desired resistivity range upon a change in relative humidity of from about 0 to about 80% relative humidity. The original desired resistivity is the desired resistivity which is measured at room temperature, or about 25° C., and at ambient relative humidity, or about 50% relative humidity. This desired resistivity will be a resistivity chosen for a particular coating for a specific component. The desired resistivity will vary depending on the component and the desired qualities, performance and use of the component. In addition to remaining stable upon broad changes in temperature and relative humidity, the controlled resistivity is virtually unaffected by exposure of the coating to corona affluent.

Using fluorinated carbon as a filler in fluoroelastomers which are formed into coatings or layers for components useful in xerographic applications helps to solve the problems related to incomplete toner transfer from component to component or hot offset caused by toner from the substrate adhering to the fusing surface. The coatings and layers in accordance with the present invention, enable high yield transfer of toner particles from the various component members due to the combination of fluorinated carbon and fluoroelastomer which, in combination, provide for a stable resistivity within the desired range. Further, such fluorinated carbon filled fluoroelastomers greatly reduce the charge exchange between the components, or between the components and a substrate.

The particular resistivity of the fluoropolymer composition can be chosen and controlled depending, for example, on the amount of fluorinated carbon, the kind of curative, the nature of the curative, the amount of fluorine in the fluorinated carbon, and the curing procedures including the specific curing agent such as for example MgO, $Mg(OH)_2$, CaO, $Ca(OH)_2$, and the like, curing time, and curing temperature. The resistivity can be generated not only by selecting the appropriate curing agents, curing time and curing temperature as set forth above, but also by selecting a specific polymer and filler, such as a specific fluorinated carbon, or mixtures of various types of fluorinated carbon. The percentage of fluorine in the fluorinated carbon will also affect the resistivity of the fluoroelastomer when mixed therewith.

Fluorinated carbon, sometimes referred to as graphite fluoride or carbon fluoride, is a solid material resulting from the fluorination of carbon with elemental fluorine. The number of fluorine atoms per carbon atom may vary depending on the fluorination conditions. The variable fluorine atom to carbon atom stoichiometry of fluorinated carbon permits systemic, uniform variation of its electrical resistivity properties.

Fluorinated carbon refers to a specific class of compositions which is prepared by reacting fluorine to one or more of the many forms of solid carbon. In addition, the amount of fluorine can be varied in order to produce a specific, desired resistivity. Fluorocarbons are either aliphatic or aromatic organic compounds wherein one or more fluorine atoms have been attached to one or more carbon atoms to form well defined compounds with a single sharp melting point or boiling point. Fluoropolymers are linked-up single identical molecules which comprise long chains bound together by covalent bonds. Moreover, fluoroelastomers are a specific type of fluoropolymer. Thus, despite some apparent confusion in the art, it is apparent that fluorinated carbon is neither a fluorocarbon nor a fluoropolymer and the term is used in this context herein.

The fluorinated carbon may include the fluorinated carbon materials as described herein. The methods for preparation of fluorinated carbon are well known and documented in the literature, such as in the following U.S. Pat. Nos. 2,786,874; 3,925,492; 3,925,263; 3,872,032 and 4,247,608, the disclosures each of which are totally incorporated by reference herein. Essentially, fluorinated carbon is produced by heating a carbon source such as amorphous carbon, coke, charcoal, carbon black or graphite with elemental fluorine at elevated temperatures, such as 150°–600° C. A diluent such as nitrogen is preferably admixed with the fluorine. The nature and properties of the fluorinated carbon vary with the particular carbon source, the conditions of reaction and with the degree of fluorination obtained in the final product. The degree of fluorination in the final product may be varied by changing the process reaction conditions, principally temperature and time. Generally, the higher the temperature and the longer the time, the higher the fluorine content.

Fluorinated carbon of varying carbon sources and varying fluorine contents is commercially available from several sources. Preferred carbon sources are carbon black, crystalline graphite and petroleum coke. One form of fluorinated carbon which is suitable for use in accordance with the invention is polycarbon monofluoride which is usually written in the shorthand manner $CF_x$ with x representing the number of fluorine atoms and generally being up to about 1.5, preferably from about 0.01 to about 1.5, and particularly preferred from about 0.04 to about 1.4. The formula $CF_x$ has a lamellar structure composed of layers of fused six carbon rings with fluorine atoms attached to the carbons and lying above and below the plane of the carbon atoms. Preparation of $CF_x$ type fluorinated carbon is described, for example, in above-mentioned U.S. Pat. Nos. 2,786,874 and 3,925,492, the disclosures of which are incorporated by reference herein in their entirety. Generally, formation of this type of fluorinated carbon involves reacting elemental carbon with $F_2$ catalytically. This type of fluorinated carbon can be obtained commercially from many vendors, including Allied Signal, Morristown, N.J.; Central Glass International, Inc., White Plains, N.Y.; Diakin Industries, Inc., New York, N.Y.; and Advance Research Chemicals, Inc., Catoosa, Okla.

Another form of fluorinated carbon which is suitable for use in accordance with the invention is that which has been postulated by Nobuatsu Watanabe as poly(dicarbon monofluoride) which is usually written in the shorthand manner $(C_2F)_n$. The preparation of $(C_2F)_n$ type fluorinated carbon is described, for example, in above-mentioned U.S. Pat. No. 4,247,608, the disclosure of which is herein incorporated by reference in its entirety, and also in Watanabe et al., "Preparation of Poly(dicarbon monofluoride) from Petroleum Coke", Bull. Chem. Soc. Japan, 55, 3197–3199 (1982), the disclosure of which is also incorporated herein by reference in its entirety.

In addition, preferred fluorinated carbons selected include those described in U.S. Pat. No. 4,524,119 to Luly et al., the subject matter of which is hereby incorporated by reference in its entirety, and those having the tradename ACCUFLUOR®, (ACCUFLUOR® is a registered trademark of Allied Signal, Morristown, N.J.) for example, ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent fluorine content, respectively. ACCUFLUOR® 1000 and ACCUFLUOR® 2065 have 62 and 65 percent fluorine content respectively. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

The following chart illustrates some properties of four preferred fluorinated carbons of the present invention.

| PROPERTIES | ACCUFLUOR ® | | | | UNITS |
| --- | --- | --- | --- | --- | --- |
| GRADE | 1000 | 2065 | 2028 | 2010 | N/A |
| Feedstock | Coke | Conductive Carbon Black | | | N/A |
| Fluorine Content | 62 | 65 | 28 | 11 | % |
| True Density | 2.7 | 2.5 | 2.1 | 1.9 | g/cc |
| Bulk Density | 0.6 | 0.1 | 0.1 | 0.09 | g/cc |
| Decomposition Temperature | 630 | 500 | 450 | 380 | °C. |
| Median Particle Size | 8 | <1 | <1 | <1 | micrometers |
| Surface Area | 130 | 340 | 130 | 170 | $m^2/g$ |
| Thermal Conductivity | $10^{-3}$ | $10^{-3}$ | $10^{-3}$ | N.A. | cal/cm-sec-°C. |
| Electrical Resistivity | $10^{11}$ | $10^{11}$ | $10^8$ | <10 | ohm-cm |
| Color | Gray | White | Black | Black | N/A |

As has been described herein, a major advantage of the invention is the capability to vary the fluorine content of the fluorinated carbon to permit systematic uniform variation of the resistivity properties of the composition or layer. The preferred fluorine content will depend on inter alia the equipment used, equipment settings, desired resistivity, and the specific fluoroelastomer chosen. The fluorine content in the fluorinated carbon is from about 1 to about 70 weight percent based on the weight of fluorinated carbon (carbon content of from about 99 to about 30 weight percent), preferably from about 5 to about 65 (carbon content of from about 95 to about 35 weight percent), and particularly preferred from about 10 to about 30 weight percent (carbon content of from about 90 to about 70 weight percent).

The median particle size of the fluorinated carbon can be less than 1 micron and up to 10 microns, is preferably less than 1 micron, preferably from about 0.001 to about 1 microns, and particularly preferred from about 0.5 to 0.9 micron. The surface area is preferably from about 100 to about 400 $m^2/g$, preferred of from about 110 to about 340, and particularly preferred from about 130 to about 170 $m^2/g$. The density of the fluorinated carbons is preferably from about 1.5 to about 3 g/cc, preferably from about 1.9 to about 2.7 g/cc.

The amount of fluorinated carbon in the layer is from about 1 to about 50 percent by weight of the total solids content, preferably from about 1 to about 40 weight percent, and particularly preferred from about 5 to about 30 weight percent based on the weight of total solids. Total solids as used herein refers to the amount of fluoroelastomer and/or other elastomers.

It is preferable to mix different types of fluorinated carbon to tune the mechanical and electrical properties. It is desirable to use mixtures of different kinds of fluorinated carbon to achieve good resistivity while reducing the hardness of the coating. Also, mixtures of different kinds of fluorinated carbon can provide an unexpected wide formulation latitude and controlled and predictable resistivity. For example, an amount of from about 0 to about 40 percent, preferably from about 1 to about 40, and particularly preferred of from about 5 to about 35 percent by weight of ACCUFLUOR® 2010 can be mixed with an amount of from about 0 to about 40 percent, preferably from about 1 to about 40, and particularly preferred from about 5 to about 35 percent ACCUFLUOR® 2028, and even more particularly preferred from about 8 to about 25 percent ACCUFLUOR® 2028. Other forms of fluorinated carbon can also be mixed. Another example is an amount of from about 0 to about 40 percent ACCUFLUOR® 1000, and preferably from about 1 to about 40 percent, and particularly preferred from about 5 to about 35 percent, mixed with an amount of from about 0 to about 40 percent, preferably from about 1 to about 40, and particularly preferred from about 1 to about 35 percent ACCUFLUOR® 2065. All other combinations of mixing the different forms of ACCUFLUOR® are possible. A preferred mixture is from about 0 to about 15 percent ACCUFLUOR® 2028 mixed with from about 2 to about 3.5 percent ACCUFLUOR® 2010. Another preferred mixture is from about 0.5 to about 10 percent ACCUFLUOR® 2028 mixed with from about 2.0 to about 3.0 percent ACCUFLUOR® 2010. A particularly preferred mixture is from about 1 to about 3 percent ACCUFLUOR® 2028 mixed with from about 2.5 to about 3 percent ACCUFLUOR® 2010, and even more preferred is a mixture of about 3 percent ACCUFLUOR® 2010 and about 2 percent ACCUFLUOR® 2028. All the above percentages are by weight of the total solids.

The fluorinated carbon is preferably dispersed in a polymer. Examples of suitable polymers include fluoropolymers and particularly, fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein these fluoroelastomers, particularly from the class of copolymers and terpolymers of vinylidenefluoride, hexafluoropropylene and tetrafluoroethylene, are known commercially under various designations as VITON® A, VITON® E, VITON® E60C, VITON® E430, VITON® 910, VITON® GH and VITON® GF. The VITON® designation is a Trademark of E.I. DuPont de Nemours, Inc. Other commercially available materials include FLUOREL® 2170, FLUOREL® 2174, FLUOREL® 2176, FLUOREL® 2177 and FLUOREL® LVS 76. FLUOREL® is a Trademark of 3M Company. Additional commercially available materials include AFLAS[1m] a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company. In another preferred embodiment, the fluoroelastomer is one having a relatively low quantity of vinylidenefluoride, such as in VITON® GF, available from E.I. DuPont de Nemours, Inc. The VITON® GF has 35 mole percent of vinylidenefluoride, 34 mole percent of hexafluoropropylene and 29 mole percent of tetrafluoroethylene with 2 percent cure site monomer. The cure site monomer can be 4-bromoperfluorobutene-1, 1,1-dihydro-4-bromoperfluorobutene-1, 3-bromoperfluoropropene-1, 1,1-dihydro-3-bromoperfluoropropene-1, available from DuPont, or any other suitable, known cure site monomer.

Examples of fluoroelastomers suitable for use herein include elastomers of the above type, along with volume grafted elastomers. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in U.S. Pat. No. 5,166,031; U.S. Pat. No. 5,281,506; U.S. Pat. No. 5,366,772; and U.S. Pat. No. 5,370,931, the disclosures each of which are herein incorporated by reference in their entirety.

Volume graft, in embodiments, refers to a substantially uniform integral interpenetrating network of a hybrid composition, wherein both the structure and the composition of the fluoroelastomer and polyorganosiloxane are substantially uniform when taken through different slices of the layers of the member. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane.

Interpenetrating network, in embodiments, refers to the addition polymerization matrix where the fluoroelastomer and polyorganosiloxane polymer strands are intertwined in one another.

Hybrid composition, in embodiments, refers to a volume grafted composition which is comprised of fluoroelastomer and polyorganosiloxane blocks randomly arranged.

Generally, the volume grafting according to the present invention is performed in two steps, the first involves the dehydrofluorination of the fluoroelastomer preferably using an amine. During this step, hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer. In embodiments, copper oxide can be added to a solution containing the graft copolymer. The dispersion is then provided onto the substrate or conductive film surface.

In embodiments, the polyorganosiloxane having functionality according to the present invention has the formula:

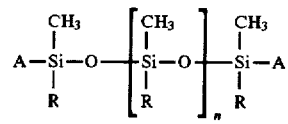

where R is an alkyl from about 1 to about 24 carbons, or an alkenyl of from about 2 to about 24 carbons, or a substituted or unsubstituted aryl of from about 4 to about 18 carbons; A is an aryl of from about 6 to about 24 carbons, a substituted or unsubstituted alkene of from about 2 to about 8 carbons, or a substituted or unsubstituted alkyne of from about 2 to about 8 carbons; and n represents the number of segments and is, for example, from about 2 to about 400, and preferably from about 10 to about 200 in embodiments.

In preferred embodiments, R is an alkyl, alkenyl or aryl, wherein alkyl contains from about 1 to about 24 carbons, preferably from about 1 to about 12 carbons; alkenyl contains from about 2 to about 24 carbons, preferably from about 2 to about 12 carbons; and aryl contains from about 6 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons, or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. Group A may also be an alkyne of from about 2 to about 8 carbons, optionally substituted with an alkyl of from about 1 to about 24 carbons or aryl of from about 6 to about 24 carbons. The group n is a number of from about 2 to about 400, and in embodiments from about 2 to about 350, and preferably from about 5 to about 100. Furthermore, in a preferred embodiment n is from about 60 to about 80, to provide a sufficient number of reactive groups to graft onto the fluoroelastomer. In the above formula, typical R groups include methyl, ethyl, propyl, butyl, pentyl, hexyl, heptyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

In a preferred embodiment of the present invention, the polymer coating or layer is comprised of a fluorinated carbon filled fluoroelastomer, wherein the fluoroelastomer is VITON® GF and the fluorinated carbon is selected from ACCUFLUOR® 1000, ACCUFLUOR® 2065, ACCUFLUOR® 2028, ACCUFLUOR® 2010, or mixtures thereof.

The amount of fluoroelastomer used to provide the coatings or layers of the present invention is dependent on the amount necessary to form the desired thickness of the coatings or layers. Specifically, the fluoroelastomer is added in an amount of from about 60 to about 99 percent, preferably about 70 to about 99 percent by weight of total solids.

Any known solvent suitable for dissolving a fluoroelastomer may be used in the present invention. Examples of suitable solvents for the present invention include methyl ethyl ketone, methyl isobutyl ketone, diethyl ketone, cyclohexanone, n-butyl acetate, amyl acetate, and the like. Specifically, the solvent is added in an amount of from about 25 to about 99 percent, preferably from about 70 to about 95 percent.

The curative package can be important in promoting controlled conductivity, and includes crosslinkers, accelerators and metal compounds such as metal oxides or metal hydroxides. The dehydrofluorinating agent which attacks the fluoroelastomer generating unsaturation is selected from basic metal oxides such as MgO, $Mg(OH)_2$, CaO, $Ca(OH)_2$ and the like, and strong nucleophilic agents such as primary, secondary and tertiary, aliphatic and aromatic amines, where the aliphatic and aromatic amines have from about 2 to about 30 carbon atoms. Also included are aliphatic and aromatic diamines and triamines having from about 2 to about 30 carbon atoms where the aromatic groups may be benzene, toluene, naphthalene, anthracene, and the like. It is generally preferred for the aromatic diamines and triamines that the aromatic group be substituted in the ortho, meta and para positions. Typical substituents include lower alkyl amino groups such as ethylamino, propylamino and butylamino, with propylamino being preferred. The particularly preferred curing agents are the nucleophilic curing agents such as VITON CURATIVE VC-50® which incorporates an accelerator (such as a quaternary phosphonium salt or salts like VC-20) and a crosslinking agent (bisphenol AF or VC-30); DIAK 1 (hexamethylenediamine carbamate) and DIAK 3 which also has a dual function and acts as an accelerator and a crosslinker (N,N'-dicinnamylidene-1,6 hexanediamine). The dehydrofluorinating agent or curing agent is added in an amount of from about 1 to about 20 weight percent, preferably from about 2 to about 10 weight percent, and particularly preferred from about 1.5 to about 5 weight percent. It has been demonstrated that the curative is important to providing resistivity in the coating. Specifically, in the absence of a curative, controlled resistivity is not attained.

Layers or coatings may be formed by forming a coating dispersion by mixing together the fluorinated carbon, fluoroelastomer, solvent and curative materials, and coating the resulting conductive coating dispersion on a substrate.

The coatings or layers may be deposited on a substrate via a well known coating processes. Known methods for forming coatings or layer(s) on a substrate include dipping, spraying such as by multiple spray applications of very thin films, casting, flow-coating, web-coating, roll-coating, extrusion, molding, or the like. It is preferred to deposit the layers by spraying such as by multiple spray applications of very thin films, by web coating or by flow-coating. More than one coating dispersion of fluorinated carbon filled fluoroelastomer can be coated on a substrate. Multiple layers or coatings can be applied to the substrate. For example, from 1 to about 5 layers or coatings can be applied to the substrate.

The coatings or layers deposited on a substrate are then dried and cured according to known curing procedures, including step heat curing. A lower resistivity is obtained when the coatings or layers are cured at a higher temperature or over a longer period of time. In other words, resistivity has been shown to decrease upon an increase in curing temperature. Similarly, resistivity has been shown to decrease upon an increase in curing time.

Preferably, the curing time is from about 1 to about 20 hours, preferably about 16 hours and the curing temperature is from about 25° to about 250° C., preferably from about 120° to about 250° C., and particularly preferred from about 160° to about 235° C. It has been demonstrated that post-treatment steps including heat-curing step and other current treatments, is important to the achievement of controlled resistivity. Specifically, in the absence of heat curing, controlled resistivity is not attained. Therefore, both a curing agent and a heat curing step are important features in providing controlled resistivity in the fluorinated carbon filled fluoroelastomers.

Current treatments have also been shown to induce electrical conductivity and controlled conductivity. The deposited fluorinated carbon filled fluoroelastomer is subjected to current treatment sufficient to induce conductivity, for example, at a current of from about 1 to about 20 miliamps, and preferably, from about 5 to about 15 miliamps. The layer is subjected to the current treatment for a time sufficient to induce electrical conductivity, for example from about 5 to about 200 minutes, and preferably from about 10 to about 150 minutes.

The mechanism is theorized as follows. It is believed that the starting fluorinated carbon undergoes a defluorination reaction with the fluoroelastomer curative during the fluoroelastomer curing. This results in a fluorinated carbon of lesser fluorine content in the binder. It is believed that this is the filler that leads to controlled resistivity. It is also possible that during defluorination, the fluorinated carbon may crosslink with the fluoroelastomer, thereby providing a more stable composition.

The coatings and layers, as used herein, can be any layer of any suitable electrical or mechanical component useful in xerographic or other electrical processes or apparatuses. The layer can be any one intermediate layer(s), or an outer coating layer of a component. Examples of such xerographic components include intermediate transfer members, bias charging members, bias transfer members, segmented electrode development members, fuser members, donor roll members, image bearing members, or any other related components.

The polymer coatings and layers comprising a fluorinated carbon filled fluoroelastomer exhibit superior electrical and mechanical properties. The coatings and layers are designed so as to enable control of electrical properties including control of resistivity in the desired resistivity range, wherein the resistivity is virtually insensitive to environmental and mechanical changes.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

A coating dispersion consisting of ACCUFLUOR® 2028 (from Allied Signal) and VITON® GF (from DuPont) in a weight ratio of 1:3 was prepared in the following manner. About 2,300 g of steel shot and 15 g of ACCUFLUOR® 2028 were added to a small bench top attritor (Model 1A), which contained 200 g of methyl ethyl ketone (MEK) (from Fisher). The mixture was gently stirred for about a minute so that the fluorinated carbon particles became wet due to the solvent. VITON® GF (45 g) was then added and the resulting mixture attrited for 30 minutes. A curative package [2.25 g VC-50 (from DuPont), 0.9 g Maglite-D (from Baker) and 0.2 g (Ca(OH)$_2$) (from Baker)] and 10 g of a stabilizing solvent, methanol, were introduced and the resulting mixture was then further mixed on the attritor for another 15 minutes. After filtering the steel shot through a wire screen, the dispersion was collected in an 8-oz polypropylene bottle. The resulting dispersion was then coated onto polyimide KAPTON® substrates (from DuPont) and on stainless steel substrates within 2–5 hours using a Gardner Laboratory Coater. The coated layers were air-dried for about 1–2 hours, and then step heat-cured in a programmable oven. The heating sequence was as follows: (1) 65° C. for 4 hours, (2) 93° C. for 2 hours, (3) 144° C. for 2 hours, (4) 177° C. for 2 hours, (5) 204° C. for 2 hours and (6) 232° C. for 16 hours. The layers were about 2.5 to about 3 mil in thickness and were post-cured at 235° C. for 16 hours. The layers that resulted were VITON® GF layers containing 25% by weight ACCUFLUOR® 2028.

The surface resistivity of the cured VITON® GF layers was measured by a Xerox Corporation in-house testing apparatus with a power supply (Trek 601C Coratrol), a Keithy electrometer (model 610B), and a two point conformable guarded electrode probe (15 mm spacing between the two electrodes). The field applied for the measurement was 500 V/cm and the measured current was converted to surface resistivity based on the geometry of the probe. The surface resistivity of the layer was determined to be approximately $1 \times 10^{10}$ ohm/sq.

The volume resistivity of the layer was determined by the standard AC conductivity technique. The surface of the VITON® GF was coated directly onto a stainless steel substrate, in the absence of an intermediate layer. An evaporated aluminum thin film (300 Å) was used as the counter electrode. The volume resistivity was found to be $6 \times 10^{11}$ ohm-cm at an electric field of 1500 V/cm. The resistivity was found to be insensitive to changes in temperature in the range of about 20° C. to about 150° C., and to changes in relative humidity in the range of about 20% to about 80%, and to the intensity of applied electric field (up to 2,000 V/cm). Furthermore, no hysteresis (memory) effect was seen after the layer was cycled to higher electric fields (>$10^4$ V/cm).

Example II

The procedures outlined in Example 1 were repeated except that the loadings of the fluorinated carbon filler ACCUFLUOR® 2028 were varied and ACCUFLUOR® 2010 was also tested. These layers were found to exhibit very similar electric properties as the layers in Example 1. The results are shown below in Table 1.

TABLE 1

RESISTIVITY DATA OF FLUORINATED CARBON IN VITON ® GF (FIELD ~1500 V/CM)

| Fluorinated Carbon | Loading (% by weight) | Surface Resistivity (ohm/sq) | Volume Resistivity (ohm-cm) |
|---|---|---|---|
| ACCUFLUOR ® 2028 | 35 | $1.7 \times 10^7$ | $\sim 1.6 \times 10^8$ |
| ACCUFLUOR ® 2028 | 30 | $1.0 \times 10^9$ | $\sim 1 \times 10^9$ |
| ACCUFLUOR ® 2028 | 20 | $8.9 \times 10^{11}$ | $\sim 2 \times 10^{13}$ |
| ACCUFLUOR ® 2010 | 30 | $8.3 \times 10^4$ | |
| ACCUFLUOR ® 2010 | 10 | $1.9 \times 10^5$ | |
| ACCUFLUOR ® 2010 | 5 | $4.1 \times 10^5$ | |
| ACCUFLUOR ® 2010 | 3.5 | $4.5 \times 10^6$ | |
| ACCUFLUOR ® 2010 | 3 | $1.7 \times 10^8$ | |

Example III

A number of resistive layers were prepared using the dispersing and coating procedure as described in Example I, with the exception that a mixture of various percentages by weight of various types of ACCUFLUOR® were mixed with VITON® GF. The compositions of the ACCUFLUOR®/VITON® GF layers and the surface resistivity results are summarized in Table 2.

TABLE 2

| Fillers in VITON ® GF (%) | Surface Resistivity (ohm/sq) |
|---|---|
| 2% ACCUFLUOR ® 2010<br>15% ACCUFLUOR ® 2028 | $4.5 \times 10^{11}$ |
| 2.5% ACCUFLUOR ® 2010<br>15% ACCUFLUOR ® 2028 | $1.0 \times 10^9$ |
| 3% ACCUFLUOR ® 2010<br>5% ACCUFLUOR ® 2028 | $5.4 \times 10^9$ |
| 3% ACCUFLUOR ® 2010<br>10% ACCUFLUOR ® 2028 | $6.4 \times 10^9$ |
| 3% ACCUFLUOR ® 2010<br>15% ACCUFLUOR ® 2028 | $1.3 \times 10^{10}$ |
| 3.5% ACCUFLUOR ® 2010<br>5% ACCUFLUOR ® 2028 | $2 \times 10^9$ |
| 3.5% ACCUFLUOR ® 2010<br>15% ACCUFLUOR ® 2028 | $7.2 \times 10^9$ |

Example IV

Resistive layers containing of 25% by weight of ACCUFLUOR® in VITON® GF were prepared according to the procedures described in Example I. However, instead of performing a post-curing at 232° C. for 16 hours, the post-curing was performed for 9 hours, 26 hours, 50 hours, 90 hours and 150 hours, respectively. The surface resistivity results are shown in Table 3.

TABLE 3

| Post-curing Time | Surface Resistivity (ohm/sq) |
|---|---|
| 9 hours | $5.5 \times 10^{10}$ |
| 26 hours | $8.8 \times 10^9$ |
| 50 hours | $1.8 \times 10^9$ |
| 90 hours | $7.3 \times 10^7$ |
| 150 hours | $7.2 \times 10^6$ |

Example V

Coating dispersions containing different concentrations of ACCUFLUOR® 2010 in VITON® GF were prepared using the attrition procedures given in Example I. These dispersions were then air-sprayed onto KAPTON® substrates. The layers (~2.5 mil) were air-dried and post-cured using the procedure outlined in Example I. The surface resistivity results are summarized in Table 4 below. The percentages are by weight.

TABLE 4

| ACCUFLUOR ® 2010 Loading in VITON ® GF (%) | Surface Resistivity (ohm/sq) |
|---|---|
| 6% | $1.6 \times 10^{12}$ |
| 7% | $7.0 \times 10^{8}$ |
| 8% | $8.5 \times 10^{7}$ |
| 10% | $6.2 \times 10^{6}$ |
| 20% | $1.1 \times 10^{5}$ |

Example VI

A resistive layer containing of 30% ACCUFLUOR® 2028 in VITON® GF was prepared according to the procedures described in Example I, with the exception that 4.5 g of curative VC-50 was used. The surface resistivity of the layer was measured using the techniques outlined in Example 1 and was found to be approximately $5.7 \times 10^{9}$ ohm/sq.

Example VII

A coating dispersion was prepared by first adding a solvent (200 g of methyl ethyl ketone), a steel shot (2,300 g) and 2.4 g of ACCUFLUOR® 2028 in a small bench top attritor (model 01A). The mixture was stirred for about one minute so as to wet the fluorinated carbon with the solvent. A polymer binder, VITON® GF (45 g), was then added and the resulting mixture was attrited for 30 minutes. A curative package (0.68 g DIAK 1 and 0.2 g Maglite Y) and a stabilizing solvent (10 g methanol) were then introduced and the mixture was further mixed for about 15 minutes. After filtering the steel shot through a wire screen, the fluorinated carbon/VITON® GF dispersion was collected in a polypropylene bottle. The dispersion was then coated onto KAPTON® substrates within 2–4 hours using a Gardner laboratory coater. The coated layers were first air-dried for approximately two hours and then heat cured in a programmable oven. The heating sequence was: (1) 65°C. for 4 hours, (2) 93° C. for 2 hours, (3) 144° C. for 2 hours, (4) 177° C. for 2 hours, (5) 204° C. for 2 hours and (6) 232° C. for 16 hours. A resistive layer (~3 mil) consisting of 5% by weight ACCUFLUOR® 2028 in VITON® GF was formed. The surface resistivity of the layer was measured according to the procedures of Example I and was found to be approximately $1 \times 10^{8}$ ohm/sq.

Example VIII

A resistive layer containing of 5% by weight ACCUFLUOR® 2028 in VITON® GF was prepared according to the procedures in Example VII, with the exception that 1.36 g of DIAK 1 was used as the curative. The surface resistivity of the layer was measured at $1 \times 10^{5}$ ohm/sq.

Example IX

A coating dispersion was prepared by first adding a solvent (200 g of methyl ethyl ketone), a steel shot (2300 g) and 1.4 g of ACCUFLUOR® 2028 in a is small bench top attritor (model 01A). The mixture was stirred for about one minute so that the fluorinated carbon became wet. A polymer binder, VITON® GF (45 g), was then added and the resulting mixture was attrited for 30 minutes. A curative package (1.36 g DIAK 3 and 0.2 g Maglite Y) and a stabilizing solvent (10 g methanol) were then introduced and the resulting mixture was further mixed for another 15 minutes. After filtering the steel shot through a wire screen, the fluorinated carbon/VITON® GF dispersion was collected in a polypropylene bottle. The dispersion was then coated onto KAPTON® substrates within 2–4 hours using a Gardner Laboratory coater. The coated layers were first air-dried for approximately 2 hours and then heat cured in a programmable oven. The heat curing sequence was: (1) 650° C. for 4 hours, (2) 93° C. for 2 hours, (3) 144° C. for 2 hours, (4) 177°C. for 2 hours, (5) 204° C. for 2 hours and (6) 232° C. for 16 hours. A resistive layer (~3 mil) consisting of 3% ACCUFLUOR® 2028 in VITON® GF was formed. The surface resistivity of the layer was approximately $8 \times 10^{6}$ ohm/sq.

Example X

Resistive layers consisting of 5% ACCUFLUOR® 2028 in VITON® GF were prepared using the dispersion and coating procedures as outlined in Example VII, with the exception that the curing times and the curing temperatures were changed. The surface resistivities of these layers are summarized in Table 5.

TABLE 5

| Curing Temperature (°C.) | Curing time (hours) | Surface Resistivity (ohm/sq) |
|---|---|---|
| 232 | 2 | $3.6 \times 10^{8}$ |
| 232 | 4.5 | $1.2 \times 10^{8}$ |
| 232 | 8 | $1.0 \times 10^{8}$ |
| 195 | 2 | $1.9 \times 10^{10}$ |
| 195 | 4.5 | $6.0 \times 10^{9}$ |
| 195 | 8 | $7.7 \times 10^{9}$ |
| 195 | 23 | $3.4 \times 10^{9}$ |
| 175 | 4.5 | $5.2 \times 10^{10}$ |
| 175 | 23 | $2.0 \times 10^{10}$ |
| 149 | 8 | $5.2 \times 10^{11}$ |
| 149 | 23 | $2.3 \times 10^{11}$ |

Example XI

Resistive layers consisting of 3% by weight ACCUFLUOR® 2028 in VITON® GF were prepared using the dispersion and coating procedures as described in Example IX, with the exception that the curing times and the curing temperatures were changed. The surface resistivities of these layers are summarized in Table 6.

TABLE 6

| Curing Temperature (°C.) | Curing Time (hours) | Surface Resistivity (ohm/sq) |
|---|---|---|
| 235 | 2.5 | $8.1 \times 10^{6}$ |
| 235 | 6 | $8.0 \times 10^{6}$ |
| 235 | 8 | $8.0 \times 10^{6}$ |
| 175 | 2.5 | $6.6 \times 10^{8}$ |
| 175 | 6 | $4 \times 10^{8}$ |
| 175 | 24 | $8.8 \times 10^{7}$ |
| 149 | 2.5 | $1.2 \times 10^{10}$ |
| 149 | 6 | $7.5 \times 10^{9}$ |
| 149 | 8.5 | $6.1 \times 10^{9}$ |
| 149 | 24 | $2.5 \times 10^{9}$ |

Example XII

A coating dispersion was prepared by first adding a solvent (200 g of methyl isobutyl ketone), a steel shot (2300 g) and 8 g of ACCUFLUOR® 2028 in a small bench top attritor (model 01A). The mixture was stirred for about one minute so that the fluorinated carbon became wet. A polymer binder, VITON® GF (45 g), was then added and the resulting mixture was attrited for 30 minutes. A curative package (2.4 g DIAK 3 and 3 g Maglite Y) was added and the resulting mixture was further mixed for another 15 minutes. After filtering the steel shot through a wire screen, the ACCUFLUOR® 2028/VITON® GF dispersion was collected in a polypropylene bottle. The dispersion was then air-sprayed onto KAPTON® substrates. After air-drying for 1–2 hours, the layer (2.4 mil) was heated at 175° C. for 3 hours. The surface resistivity and the bulk resistivity were determined as outlined in Example I and are $1.4 \times 10^7$ ohm/sq and $1 \times 10^6$ ohm-cm, respectively.

Example XIII

Resistive layers consisting of different fluorinated carbons in VITON® GF were prepared according to the procedures described in Example XII. In addition to the spray-coating, flow-coating was also used in certain dispersions. Flow coating procedures are described in Attorney Reference D/96035, U.S. application Ser. No. 08/669,761 filed Jun. 26, 1996, entitled, "LEVELING BLADE FOR FLOW COATING PROCESS FOR MANUFACTURE OF POLYMERIC PRINTER ROLL AND BELT COMPONENTS;" and Attorney Reference D/96036, U.S. application Ser. No. 08/672,493 filed Jun. 26, 1996, entitled, "FLOW COATING PROCESS FOR MANUFACTURE OF POLYMERIC PRINTER ROLL AND BELT COMPONENTS." The disclosures of both of these applications are hereby incorporated by reference in their entirety.

TABLE 7

| Filler in VITON ® GF (%) | Thickness (mil) | Surface Resistivity (ohm/sq) | Bulk Resistivity (ohm-cm) |
| --- | --- | --- | --- |
| 10% ACCUFLUOR ® 2010 (by spray) | 1.6 | $8 \times 10^4$ | $1 \times 10^3$ |
| (by flow-coating) | 2.3 | $9 \times 10^3$ | $\sim 1 \times 10^3$ |
| 10% ACCUFLUOR ® 2010 4% ACCUFLUOR ® 2028 (by spray) | 2.4 | $1.5 \times 10^6$ | $1 \times 10^5$ |
| 10% ACCUFLUOR ® 2010 5% ACCUFLUOR ® 2028 (by spray) | 1.5 | $1.2 \times 10^6$ | $1.5 \times 10^4$ |

Example XIV

A VITON® GF layer consisting of about 15% by weight of ACCUFLUOR® 2028 was prepared and heat cured according to the procedures described in Example I. The surface resistivity of the layer was determined to be $>10^{14}$ ohm/sq and the volume resistivity was found to be $\sim 1 \times 10^{13}$ ohm-cm. A gold electrode (~800 Å thick, 0–25 inch diameter) was evaporated onto a "sister" sample which was coated onto a stainless steel substrate. The VITON® GF layer, which is now sandwiched between two electrodes, was subjected to a current treatment by increasing the applied voltage incrementally up to 750 V/cm. An amount of 10 miliamps of DC current was applied to the layer for 10 minutes. The bulk resistivity of this layer was decreased to $\sim 5 \times 10^{10}$ ohm-cm.

Example XV

A VITON® GF layer consisting about 30% by weight of ACCUFLUOR® 2028 was prepared according to the procedures outlined in Example I, except that this layer was not heat cured. The surface resistivity was $>10^{14}$ ohm/sq and the bulk resistivity was $\sim 10^{13}$ ohm-cm. This layer was then subjected to a current treatment using the procedures set forth in Example XIV. In this example, the current treatment lasted for about 2 hours. After the current treatment, the bulk resistivity of the layer decreased to $\sim 1.2 \times 10^9$ ohm-cm.

Example XVI

About 15 g of ACCUFLUOR® 2065 was dispersed in 200 g of methyl ethyl ketone. A curative package containing 2.25 g of VC 50, 0.9 g Maglite-D and 0.2 g Ca(OH)$_2$ was added. After mixing, the solvent was removed in an evaporator and the contents were dried in a vacuum oven, yielding a gray powder sample. When this sample was heated at 235° C. for 16 hours, the color of the powder changed from gray to black.

Example XVII

The procedures in Example XVI were repeated except that ACCUFLUOR® 2065 was heated in the absence of the curative package. No change in color was observed. These two experiments demonstrate that the curative causes defluorination of ACCUFLUOR® 2065, leading to a less fluorinated, black fluorinated carbon.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A process for producing a fluorinated carbon filled fluoroelastomer coating comprising:
   a) mixing a fluorinated carbon with a fluoroelastomer;
   b) mixing a curative therewith to form a dispersion;
   c) depositing said dispersion onto a substrate to form a layer; and
   d) curing said deposited layer to form a fluorinated carbon filled fluoroelastomer coating, wherein said fluoroelastomer is selected from the group consisting of (i) terpolymers of vinylidenefluoride, hexafluoropropylene and tetrafluoroethylene, (ii) tetrapolymers of vinylidenefluoride, hexafluoropropylene, tetrafluoroethylene and a cure site monomer, and (iii) volume grafted fluoroelastomers.

2. A process in accordance with claim 1, wherein the fluoroelastomer is selected from the group consisting of (i) terporymers of vinylidenefluoride, hexafluoropropylene and tetrafluoroethylene, and (ii) tetrapolymers of vinylidenefluoride, hexafluoropropylene, tetrafluoroethylene and a cure site monomer.

3. A process in accordance with claim 2, wherein the fluoroelastomer comprises about 35 mole percent of vinylidenefluoride, about 34 mole percent of hexafluoropropylene, about 29 mole percent of tetrafluoroethylene and about 2 mole percent of a cure site monomer.

4. A process in accordance with claim 1, wherein the fluorinated carbon is of the formula CF$_x$, wherein x represents the number of fluorine atoms.

5. A process in accordance with claim 4, wherein x is a number of from about 0.02 to about 1.5.

6. A process in accordance with claim 1, wherein the fluorinated carbon is present in an amount of from about 1 to about 40 percent by weight based on the weight of total solids.

7. A process in accordance with claim 1, wherein the fluorinated carbon has a fluorine content of from about 1 to about 70 weight percent based on the weight of fluorinated carbon, and a carbon content of from about 99 to about 30 weight percent based on the weight of fluorinated carbon.

8. A process in accordance with claim 1, wherein said fluorinated carbon is selected from the group consisting of a fluorinated carbon having a fluorine content of 62 weight percent, a fluorinated carbon having a fluorine content of 11 weight percent, a fluorinated carbon having a fluorine content of 28 weight percent, and a fluorinated carbon having a fluorine content of 65 weight percent based on the weight of fluorinated carbon.

9. A process in accordance with claim 1, wherein the fluoroelastomer is present in an amount of from about 60 to about 99 percent by weight based on the weight of total solids.

10. A process in accordance with claim 1, wherein said fluoroelastomer is a volume grafted fluoroelastomer.

11. A process in accordance with claim 1, wherein said fluoroelastomer carbon is defluorinated.

12. A process in accordance with claim 1, wherein said curing comprises thermal curing at a temperature of from about 120° to about 250° C.

13. A process in accordance with claim 12, wherein said thermal curing is for a period of from about 1 to about 20 hours.

14. A process in accordance with claim 1, wherein said curing comprises subjecting said layer to a current.

15. A process in accordance with claim 14, wherein said curing is at a current of from about 1 to about 20 amps.

16. A process in accordance with claim 15, wherein said curing is from about 10 to about 150 minutes.

17. A process in accordance with claim 1, wherein said curative comprises a metal compound selected from the group consisting of metal oxides and metal hydroxides.

18. A process in accordance with claim 17, wherein said curative comprises a metal compound selected from the group consisting of magnesium oxide, magnesium hydroxide, calcium oxide, calcium hydroxide, and mixtures thereof.

19. A process in accordance with claim 1, wherein said curative comprises a nucleophilic curing agent.

20. A process in accordance with claim 19, wherein said curative comprises an accelerator and a crosslinking agent.

21. A process in accordance with claim 20, wherein said accelerator is a quaternary phosphonium salt.

22. A process in accordance with claim 20, wherein said crosslinking agent is a bisphenol.

23. A process in accordance with claim 19, wherein said nucleophilic curing agent is selected from the group consisting of hexamethylenediamine carbamate and N,N-dicinnamyldene-1,6, hexanediamine.

24. A process in accordance with claim 1, wherein said dispersion is deposited on a substrate by flow coating, dip coating, spray coating or web coating the dispersion.

25. A process in accordance with claim 23, wherein more than one fluorinated carbon filled fluoroelastomer coating dispersion layer is deposited on the substrate.

26. A process for controlling the resistivity of a coating comprising:
   a) mixing a fluorinated carbon with a fluoroelastomer;
   b) mixing a curative therewith to form a dispersion;
   c) depositing said dispersion onto a substrate to form a layer; and
   d) curing said deposited layer to form a fluorinated carbon filled fluoroelastomer coating, wherein said fluorinated carbon filled fluoroelastomer coating has a controlled resistivity of from about $10^2$ to about $10^{14}$ ohm-cm.

27. A process in accordance with claim 26, wherein said controlled resistivity is from about $10^3$ to about $10^{12}$ ohm-cm.

28. A process in accordance with claim 26, wherein said coating has a first resistivity and a second resistivity, wherein said first resistivity is a resistivity of said coating at room temperature, and wherein said second resistivity is a resistivity of said coating upon a change in temperature, wherein said second resistivity remains within about 50 to about 100% of said first resistivity at a temperature range of from about 0° to about 200° C.

29. A process in accordance with claim 28, wherein said room temperature is about 25° C.

30. A process in accordance with claim 26, wherein said coating has a first resistivity and a second resistivity, wherein said first resistivity is a resistivity of said coating at ambient relative humidity, and wherein said second resistivity is a resistivity of said coating upon a change in relative humidity, wherein said second resistivity remains within about 50 to about 100% of said first resistivity at a relative humidity range of from about 0% to about 80% relative humidity.

31. A process in accordance with claim 30, wherein said ambient relative humidity is about 50% relative humidity.

32. A process for the preparation of a component comprised of a substrate and a fluorinated carbon filled fluoroelastomer coating, wherein said process comprises:
   a) mixing a fluorinated carbon with a fluoroelastomer;
   b) mixing a curative therewith to form a dispersion;
   c) depositing said dispersion onto a substrate to form a layer; and
   d) curing said deposited layer to form a fluorinated carbon filled fluoroelastomer coating, wherein said fluorinated carbon filled fluoroelastomer coating has a controlled resistivity of from about $10^2$ to about $10^{14}$ ohm-cm.

* * * * *